United States Patent [19]

Imamura et al.

[11] Patent Number: 4,828,598

[45] Date of Patent: May 9, 1989

[54] METHOD FOR BENDING GLASS PLATES FOR A LAMINATED GLASS

[75] Inventors: Takaharu Imamura; Hiroshi Tsuji, both of Yokohama, Japan; Chikao Aruga, Jakarta, Indonesia; Tohru Kawatsura, Tokyo, Japan

[73] Assignee: Asahi Glass Company Ltd., Tokyo, Japan

[21] Appl. No.: 150,298

[22] Filed: Jan. 29, 1988

[30] Foreign Application Priority Data

Feb. 3, 1987 [JP] Japan ................................. 62-21681

[51] Int. Cl.$^4$ ............................................. C03B 23/02
[52] U.S. Cl. ........................................ 65/104; 65/106; 65/107
[58] Field of Search ................. 65/107, 104, 106, 160, 65/273

[56] References Cited

U.S. PATENT DOCUMENTS 4,009,064 2/1977 Andrews ............................... 65/107
4,738,704 4/1988 Vanaschen et al. ................... 65/106

Primary Examiner—Arthur Kellogg
Attorney, Agent, or Firm—Oblon, Fisher, Spivak, McClelland & Maier

[57] ABSTRACT

A method for bending a glass plate for a laminated glass comprises a step of heating at least two glass plates separately at a temperature suitable to conduct bending operation and bending them; a step of gradually cooling each of them; a step of transferring the at least two glass plates onto a bending ring mold in an overlapping state; and a step of heat-shaping the overlapping glass plates on the bending ring mold so that the surfaces of the glass plates are fitted to and are in coincidence with each other.

6 Claims, 2 Drawing Sheets

METHOD FOR BENDING GLASS PLATES FOR A LAMINATED GLASS

BACKGROUND OF THE INVENTION

1. FIELD OF THE INVENTION

The present invention relates to a method for bending a glass plate for a laminated glass.

2. DISCUSSION OF BACKGROUND

When a laminated glass having a curved surface is to be manufactured, it is necessary for a plurality of glass plates, (for instance, two glass plates) to be laminated to have the same radius of curvature and shape. Otherwise, there occur such problems as that the glass plate may be broken during bending operations, or undesired bubbles and a white-cloudy phenomenon may be result in a mating surface of the laminated glass when it is in use, or the mating surfaced may be releaced in use.

As a method of bending two glass plates used for manufacturing the laminated glass having a curved surface, there has been proposed a deadweight bending method in which the two glass plates are placed in an overlapping state on a bending ring mold having a predetermined shaping surface to coincide the radius of curvature and the shape of the glass plates, followed by heating them, whereby the two glass plates are simultaneously bent along the curved surface of the bending ring mold by its deadweight at a temperature which causes the softening of the glass plates. However, when the deadweight bending method is used in the case that a print-coating layer such as colored ceramics paint or an electric conductive paste is previously provided on the mating surface of the two glass plates, there occurs mutual close-contact between the glass plates through the print-coating layer when the bending operation is carried out at a high temperature. Therefore, in the deadweight bending method, an additional process is required. Namely, the print-coating layer has to be formed by previously baking at such a temperature that the glass plates do not deform themselves in an oven, after the print-coating layer has been dried.

On the other hand, there have been proposed a pressing method and a vacuum suction method for bending the glass plates for the laminated glass other than the above-mentioned deadweight bending method. The former is, for instance, to place each of the glass plates on each of bending ring molds or to hang each of the glass plates, followed by bending it by using a pair of pressing molds, and the latter is to place at least two glass plates one by one on a mold having a predetermined shaping surface followed by subjecting each of the glass plates to suction for the bending operation.

Even in the above-mentioned conventional methods, it was still possible to form glass plates having good contacting properties so as to render the radius of curvature and the shape of the glass plates to be in coincidence with each other when they are bonded in the case that the laminated glass to be manufactured does not have a very complicated curved surface.

In recent years, there have increasingly been demands for a laminated glass having a complicated curved surface such as one having a three-dimensional curved surface which is formed by projecting the glass plates in a steric form, one having a curved surface in substantially S-like form in cross-section difficult to form it, and one having both side parts formed by the deep-bending of them.

When the laminated glass having such complicated curved surface is manufactured, it is necessary to further increase the degree of softness in at least two glass plates to be bent. Accordingly, it is necessary to conduct a shaping process by elevating the temperature at the surface of the glass plates to the extent of 630° C. or higher.

However, when the conventional deadweight bending method is carried out under the condition of such a high temperature, a parting composition such as sodium bicarbonate or zeolite which is previously provided on the mating surfaces between the glass plates to avoid the close-contact of them, fine particles of curret, or glass powder produced in a cutting process or in a chamfering process may protrude into or deposit on the glass plates, with the result that undesirable optical strain may be produced. Further, it is difficult for the deadweight bending method to impart such complicated curved surfaces to the glass plates.

On the other hand, in the above-mentioned pressing method or vacuum suction method, it is difficult to obtain the same radius of curvature and the shape for the glass plates to be laminated because they have to be bent one by one.

Accordingly, there still remain such technical problems that coincidence in shape of the glass plates and surface fitness of the glass plates can not be obtained in the manufacture of the laminated glass having the complicated curved surface.

OBJECT OF THE INVENTION

It is an object of the present invention to provide a method for bending a glass plate for a laminated glass having good surface fitness between glass plates to be laminated.

SUMMARY OF THE INVENTION

The foregoing and other objects of the present invention have been attained by providing a method for bending a glass plate for a laminated glass which comprises a step of heating at least two glass plates separately at a temperature suitable for conducting a bending operation and bending them; a step of gradually cooling each of them; a step of transferring the at least two glass plates onto a bending ring mold in an overlapping state; and a step of heat-shaping the overlapping glass plates on the bending ring mold so that the surfaces of the glass plates are fitted to and are in coincidence with each other.

More specifically, the method for bending the glass plate of the present invention comprises a step of heating two or three glass plates as element sheets of the laminated glass separately at a temperature suitable for bending them (for instance, in the range of from 560° C.–700° C.) to thereby conduct the bending operation, a step of gradually cooling each of the glass plates, a step of placing the glass plates, after cooling, on a bending ring mold in an overlapping state, an a state of heat-shaping the overlapping glass plates on the bending ring mold so that the surfaces of the glass plates are fitted to and are in coincidence with each other.

As the above-mentioned bending step, the following measures may be employed.

There is a method of bending the glass plates by utilizing their deadweight. Namely, each of the glass plates is placed on a corresponding bending ring mold having the same or the substantially the same radius of curvature and the shape as those of the glass plate as the final product, and the glass plates on the bending ring molds are put in an oven to soften them by heat, whereby the glass plates are bent so that the surfaces of the glass plates are in coincidence with the shaping surface of the bending ring molds.

There is a bending method which is obtained by press-shaping each of the glass plates, which are bent by the deadweight bending method, by using a pair of male and female pressing molds.

There is a bending method wherein at least two glass plates are heated at a temperature suitable to conduct bending operation while they are separately conveyed on a train of rollers or a hearth bed in the horizontal direction, followed by subjecting separately the heated glass plates to suction on a vacuum suction mold to thereby conduct the bending operation.

There is a bending method wherein at least two glass plates are heated at a temperature suitable to conduct bending operation while they are separately conveyed on a train of rollers or a hearth bed in the horizontal direction, and then, the heated glass plates are separately transferred onto a pair of pressing molds having a predetermined shape, followed by press-shaping them on the molds.

There is a bending method wherein at least two glass plates are heated at a temperature suitable to conduct bending operation while they are separately conveyed on a train of rollers or a hearth bed in the horizontal direction, and then, the heated glass plates are separately transferred onto a vacuum suction mold having a predetermined shape to be subjected to suction by the mold, and thereafter, the glass plates are transferred separately onto a bending ring mold having a predetermined shape for the bending operation.

There is a bending method wherein at least two glass plates are heated at a temperature suitable to conduct bending operation while they are separately conveyed on a train of rollers or a hearth bed in the horizontal direction, and then, they are transferred onto a vacuum suction mold having a predetermined shape, followed by subjecting them to heat and suction, and thereafter, they are separately transferred on a bending ring mold having a predetermined shape, and finally, each of the glass plates is vertically lowered by its deadweight to conduct the bending operation.

There is a bending method wherein at least two glass plates are heated at a temperature suitable to conduct bending operation while they are separately conveyed on a train of rollers or a hearth bed in the horizontal direction, and the heated glass plates are sequentially transferred onto a vacuum suction mold having a predetermined shape to be subjected to suction on it, and the peripheral portion of the glass plate is pressed by a shaping ring mold while it is sucked in the vacuum suction mold.

There is a bending method wherein at least two glass plates are heated at a temperature suitable to conduct bending operation while they are separately conveyed on a train of rollers or a hearth bed in the horizontal direction, and then, they are separately transferred onto a shaping mold having a predetermined curved shape, followed by lowering the upper mold to thereby conduct the bending operation.

There is a bending method wherein at least two glass plates are heated at a temperature suitable to conduct bending operation while they are separately conveyed on a train of rollers or a hearth bed in the horizontal direction, then, they are passed through shaping rollers having a predetermined shape.

Other suitable bending methods as conventionally used can be used.

Thus, the curved glass plates are gradually cooled so as to be used for the laminated glass. Generally, the laminated glass is used as the front glass panel of an automobile. The front glass should be formed so as not to be broken into fine fragments at its front part as is a strengthened glass even though a shock is applied to it. Further, the front glass should be formed so as not to have a high strenght because there is a danger of injury of the head of a driver when he hits the front glass. Accordingly, the two glass plates having the substantially same shape and radius of curvature are cooled so as not to have any stress in the glass plates from the viewpoint of safeness and assurance of the visual field of the driver as well as of a suitable hardness.

The cooling step may be carried out in such a manner that at least two glass plates are placed simultaneously one by one on a bending ring mold having a predetermined shape for bending, followed by annealing or gradually cooling them in their annealing temperature range from about 600° C. to about 450° C.

Then, the two glass plates (it may be more than two glass plates) after having been annealed or gradually cooled are placed on a bending ring mold having the peripheral ring mold by which the final shape of the peripheral portion of the glass plates is given, in an overlapping state, then, the bending ring mold with the overlapping glass plates is put into an oven in which the glass plates are heated again at a temperature in the range of 550° C.–650° C. (preferably, 580° C.–620° C.) for regulating their shape. Thus, the glass plates as the element sheets for the laminated glass having the same plane shape and the radius of curvature can be obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

PREFERRED EMBODIMENT OF THE PRESENT INVENTION

An embodiment of the present invention will be described with reference to the drawings.

Figure 1:
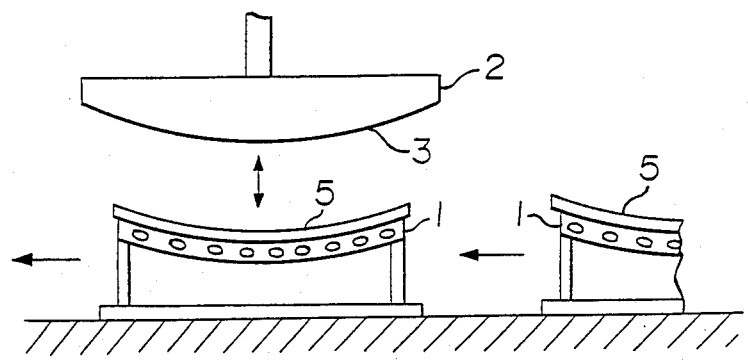
FIG. 1 is a diagram showing an example of an apparatus used for carring out the bending method for a glass plate according to the present invention.

FIG. 1 shows an example of bending a glass plate in a press-molding process. Namely, each of glass plates 5 is placed on a corresponding bending ring mold 1 successively conveyed, the bending ring molds 1 having the same or substantially the same radius of curvature and shape as those glass plate as a final product. The bending ring molds 1 supporting the glass plates 5 are successively put into a heating oven in which the glass plates are softened by application of heat and are bent by their deadweight so that the peripheral portion of each of the glass plates 5 becomes coincident with the shaping curved surface of each of the bending ring molds 1. Then each of the glass plates 5 on the corresponding bending ring mold 1 is subjected to press-shaping by the application of a compression force by lowering an upper pressing mold 2 having a pressing surface 3. In this case, the compression force may be applied by causing the relative vertical movement between the upper pressing mold 2 and the bending ring mold 1 mounting thereon the glass plate 5.

The upper pressing mold 2 may be constituted by a metal substrate such as iron, stainless steel, an alloy such as Inconel or Monel, or a ceramic material. Among these materials, a stainless steel series material is preferably used from the viewpoint of its having heat resistance properties and requirements for finishing the pressing surface 3 of the upper pressing mold 2 to be a mirror-like surface. Further, the pressing surface 3 of the pressing mold 2 may be covered by cloth having heat-resistance properties such as cloth made of glass fibers, quartz fibers, ceramic fibers, metallic fibers and so on.

With regard to the size of the upper pressing mold 2 itself, there is a restriction as follows. Namely, it is necessary to avoid the production of distortion in the surface of the glass plate 5 press-molded which may be caused by a strong compression force to the glass plate 5 by the peripheral portion of the pressing surface 3 of the upper pressing mold 2 when the glass plate 5 is pressed. Therefore, it is desirable that the surface area of the pressing surface 3 should be made greater than that of the glass plate 5. Further, the shape of the pressing surface 3 of the upper pressing mold 2 preferably has a radius of curvature greater than that of the glass plate 5 so that the pressing surface 3 compresses the peripheral portion of the glass plate 5 in a non-contact state so that and it provides the press-shaping of the glass plate 5 in a desired shape when the upper pressing mold 2 compresses the glass plate 5. With such construction, the trace of contact between the pressing surface 3 of the upper pressing mold 2 and a print-coating layer can be avoided in the case that the print-coating layer such as colored ceramics paint is disposed at the peripheral portion of the glass plate 5. A relative vertical movement between the upper pressing mold 2 and the bending ring mold 1 can be obtained by a driving device such as or an air cylinder, an oil cylinder, an electric motor (not shown). It is preferable to use the electric motor to obtain a stable moving speed.

From the viewpoint of assurance of a shaping tact, the shape of the surface of the glass plate, stability in the radius of curvature and so on, the descending speed of the upper pressing mold 2 or the ascending speed of the bending ring mold 1 is preferably in the range of from 0.3 mm/sec-3 mm/sec.

The temperature at the surface of the glass plate 5 at the time when the pressing surface 3 of the upper pressing mold 2 comes into contact with the surface of the glass plate 5 is in the range of from 550° C.-650° C. (more preferably 580° C.-620° C.) from the standpoint of assurance of the shape of the surface of the glass plate 5, stability in the radius of curvature, the strength in the glass edge portion and so on. The glass plate 5 is kept compressed for a predetermined time period after the upper pressing mold 2 has been lowered or the bending ring mold 1 has been raised. In this case, the holding time is 1 sec-60 sec (preferably, 1 sec-10) sec from the viewpoint of assurance of the shaping tact, the shape of the surface of the glass plate, stability in the radius of curvature and so on.

After the completion of the press-shaping step, the glass plate 5 on each of the bending ring molds 1 is gradually cooled for a predetermined time period. Then the glass plate 5 is transferred to the next step, (i.e., to a glass-plate-overlapping), during which it is placed on each of the bending ring molds 1.

Figure 2:
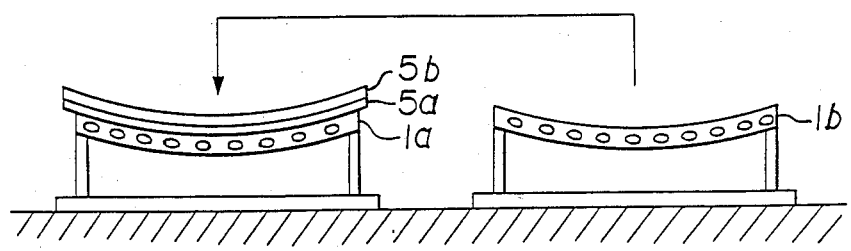
FIG. 2 is a diagram showing an example of a process for laminating glass plates.

In the glass-plate-overlapping step, one glass plate 5b is removed from the bending ring mold 1b supporting the glass plate 5a, and the glass plate 5b on the glass plate 5a supported by the other bending ring mold 1a as shown in FIG. 2, the latter glass plate 5a constituting the outer glass plate when the laminated glass plate is fitted to an automobile. In this case, a print-coating layer may be formed on the mating surface of either one of the glass plates 5a, 5b. Since the print-coating layer is formed by baking in the previous bending step, mutual close-contact in the glass plates can be avoided even when they are overlapped.

After the glass-plate-overlapping step, the bending ring mold 1a on which the two glass plates 5a, 5b are placed in an overlapping state is carried to the next heat-shaping step, and the other bending ring mold 1b from which the glass plate 5b is removed was returned to the bending step which was carried out at the beginning, through a suitable conveying means such as a return conveyor.

The heat-shaping step is to regulate the shape of the two glass plates 5a, 5b on the bending ring mold 1a in an overlapping state so as to attain certain mutual contact between the peripheral portions of the two glass plate. Accordingly, temperature for heating the glass plates is in the range of 500° C.-650° C. (preferably, in the range of 530° C.-580° C.) so as not to cause change in the shape of the surface of the two glass plates 5a, 5b and to cause mutual fitness without any optical distortion.

As a feature of the present invention, the heat-shaping step is incorporated at the final stage of the method. Accordingly, it is possible to obtain a correct radius of curvature, the surface shape and excellent fitting properties for the peripheral portions of the both glass plates by placing, on the single bending ring mold, a plurality of (for instance, two) glass plates which are to be separately bent, in an overlapping state, followed by heating them again. The reason the mutual contact between the peripheral portions of the at least two glass plates is obtainable is because of the fact that the gradient of increase in temperature at the peripheral portion of the glass plates is steeper than that at the surface area of the glass plates in the heating oven.

In the following, several examples of the present invention will be described.

EXAMPLE 1

Two glass plates 5a, 5b made of float sheet glass having a thickness of 2 mm were separately placed on two bending ring molds 1 having the same size. The glass plates 5a, 5b were fitted to the shape of the shaping surface of each of the bending ring molds 1 at the bending step. Pressing operations were carried out at a temperature of 530° C. and a pressing speed of 1.1 mm/sec. The thus obtained glass plates 5 respectively had a height of 13.5 mm at the central portion of the convex glass surface. The greatest gap at the non-contacting area produced when the two glass plates 5a, 5b were overlapped was 0.3 mm.

The two glass plates 5a, 5b were placed on the same bending ring mold 1 in an overlapping state. Then, they were introduced into a heating oven in which they were bent according to the shape of the shaping surface of the ring mold 1 at a temperature of 570° C. for 5 minutes in a heat-shaping step as the final step. In the two glass plates, complete mutual contact was obtained without any change in the height of the convex glass surface at the central portion of the glass plates.

EXAMPLE 2

Figure 3:
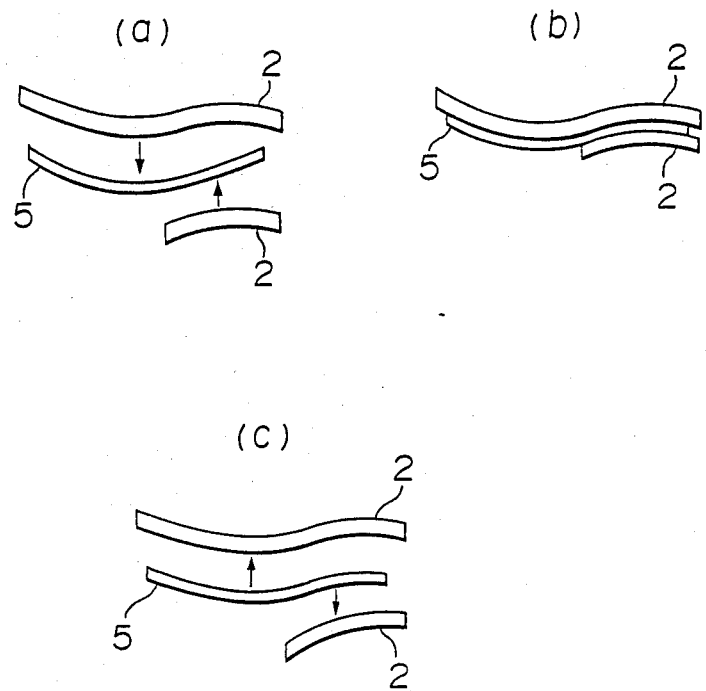
FIGS. 3a, 3b and 3c are diagrams showing an example of the press-shaping step by using a pair of pressing molds according to the present invention.

Two glass plates 5a, 5b made of float sheet glass having a thickness of 2 mm were separately placed on two bending ring molds 1 having the same size. The two glass plates were fitted to the shape of the shaping surface of the bending ring molds 1 at a bending step. Each of the glass plates was placed by using the upper pressing mold 2 and a lower pressing mold 4 at a temperature of 598° C. and a pressing speed of 1.1 mm/sec at a press-shaping step as shown in FIGS. 3a and 3b.

As a result, glass 5a, 5b each having substantially S-like shape in cross section were obtained. The greatest gap at the non-contacting area produced when the two glass plates were overlapped was 0.7 mm.

The two glass plates 5a, 5b were placed on the same bending ring mold 1 in an overlapping state. The glass plates 5a, 5b were heated in a heating oven at a temperature of 560° C. for 10 minutes to fit to each other as a heat-shaping step as the final step. Complete mutual contact between the two glass plates 5a, 5b was obtained without any change in the shape of the surface area of the two glass plates.

In accordance with the present invention in which the bending operation is carried out for each of the glass plates, the press-shaping of the glass plates having a complicated curved surface can be easily done. Further, optical distortion (which may be caused by a parting composition or curret entering in the glass plates when the deadweight bending method is conducted for two overlapped glass plates at a high temperature) can be avoided. Futhermore, by the heat-shaping step as the final step, occurrence of the non-contacting area due to noncoincidence of the shape and radius of curvature between two overlapping glass plates at their peripheral portions and the inner surface areas can be eliminated, whereby an excellent laminated glass can be manufactured without causing any bubbles or a white-cloudy phenomenon.

Obviously, numerous modifications and variations of the present invention are possible in light of the above teachings. It is therefore to be understood that, within the scope of the appended claims, the invention may be practiced otherwise than as specifically described herein.

What is claimed is:

1. A method for bending a glass plate for a laminated glass which comprises:
   (a) heating at least two glass plates separately to a temperature suitable for bending them;
   (b) separately bending said at least two glass plates;
   (c) separately annealing or gradually cooling each of said at least two glass plates;
   (d) transferring said at least two glass plates onto a bending ring mold in an overlapping state; and
   (e) heating said overlapping glass plates on said bending ring mold to a temperature high enough so that the surfaces of the glass plates are fitted to and are in coincidence with each other but not high enough so that the curvature is significantly changed.

2. The method according to claim 1, which comprises:
   (a) placing each of said at least two glass plates on a separate bending ring mold which has the same or substantially the same shape, followed by heating them separately to bend them;
   (b) press-shaping successively each one of said at least two glass plates placed on said bending ring molds by causing a relative vertical movement of each of said bending ring molds to a corresponding pressing mold;
   (c) annealing or gradually cooling each one of said at least two glass plates on the corresponding one of said bending ring molds;
   (d) removing one or more of said at least two glass plates except one glass plate from its or their bending ring molds and, then, placing it or them on the specified glass plate on the bending ring mold in an overlapping state; and
   (e) heat-shaping said overlapping glass plates so that the surfaces of the glass plates are fitted to and are in coincidence with each other.

3. The method according to claim 1, which comprises:
   (a) heating said at least two glass plates to a temperature suitable for bending them while they are separately conveyed horizontally, followed by separately subjecting each one of said at least two heated glass plates to suction on a vacuum suction mold having a predetermined shape to thereby bend them;
   (b) removing each one of said at least two glass plates from the corresponding one of said vacuum suction molds and placing each one of said at least two glass plates on a corresponding bending ring mold having a predetermined shape to anneal or gradually cool it;
   (c) removing one or more of said at least two glass plates except one glass plate from its or their bending ring molds and, then, placing it or them on the specified glass plate on the bending ring mold in an overlapping state; and
   (d) heat-shaping said overlapping glass plates so that the surfaces of the glass plates are fitted to and are in coincidence with each other.

4. The method according to claim 1, which comprises:
   (a) heating said at least two glass plates to a temperature suitable for bending them while they are separately conveyed horizontally, followed by press-molding each one of said at least two heated glass plates by a pair of pressing molds having a predetermined shape to thereby bend them;
   (b) removing each one of said at least two glass plates from the corresponding pair of pressing molds and placing each one of said at least two glass plates on a corresponding bending ring mold having a predetermined shape to anneal or gradually cool it;
   (c) removing one or more of said at least two glass plates except one glass plate from its or their bending ring molds and, then, placing it or them on the specified glass plate on the bending ring mold in an overlapping state; and
   (d) heat-shaping said overlapping glass plates so that the surfaces of the glass plates are fitted to and are in coincidence with each other.

5. The method according to claim 1, which comprises:
   (a) heating said at least two glass plates to a temperature suitable for bending them while they are separately conveyed horizontally, followed by separately subjecting each one of said at least two heated glass plates to a vacuum suction mold having a predetermined shape, and, then, sequentially transferring the glass plates to a bending mold to bend them;

(b) transferring each one of said at least two glass plates from the corresponding one of said bending molds to a corresponding bending ring mold having a predetermined shape to anneal or gradually cool it;

(c) removing one or more of said at least two glass plates except one glass plate from its or their bending ring molds and, then, placing it or them on the specified glass plate on the bending ring mold in an overlapping state; and (d) heat-shaping said overlapping glass plates so that the surfaces of the glass plates are fitted to and are in coincidence with each other.

6. The method according to claim 1, wherein said heat-shaping step is conducted by heating again said overlapping glass plates at a temperature ranging from 550° C. to 650° C. so that the surfaces of the glass plates are fitted to and are in coincidence with each other.

* * * * *